(12) United States Patent
Hibi et al.

(10) Patent No.: US 8,736,931 B2
(45) Date of Patent: May 27, 2014

(54) IMAGE PROCESSOR, IMAGE FORMING SYSTEM, IMAGE PROCESSING METHOD AND COMPUTER READABLE MEDIUM

(75) Inventors: Yoshiharu Hibi, Ebina (JP); Masaomi Sakamoto, Ebina (JP); Ryouichi Satoh, Ebina (JP); Toshifumi Takahira, Ebina (JP); Pauvi Sulistio, Ebina (JP); Kazuyuki Takahashi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 684 days.

(21) Appl. No.: 12/771,503

(22) Filed: Apr. 30, 2010

(65) Prior Publication Data

US 2011/0080600 A1     Apr. 7, 2011

(30) Foreign Application Priority Data

Oct. 5, 2009   (JP) ................... 2009-231761

(51) Int. Cl.
  *G03F 3/08*    (2006.01)
  *H04N 1/60*   (2006.01)
  *G01J 3/46*    (2006.01)

(52) U.S. Cl.
  CPC . *H04N 1/60* (2013.01); *G01J 3/462* (2013.01); *H04N 1/6002* (2013.01); *H04N 1/6016* (2013.01); *H04N 1/6019* (2013.01); *H04N 1/6025* (2013.01)
  USPC ............ 358/523; 358/1.9; 358/2.1; 358/3.23; 358/518; 358/520

(58) Field of Classification Search
  CPC ......................................... H04N 1/60
  USPC ............... 358/1.9, 3.2–3.26, 518–523
  See application file for complete search history.

(56) References Cited

U.S. PATENT DOCUMENTS

| | | | |
|---|---|---|---|
| 7,369,272 B2* | 5/2008 | Ito et al. | .......... 358/1.9 |
| 7,474,438 B2 | 1/2009 | Gondek | |
| 7,515,304 B2* | 4/2009 | Ito et al. | .......... 358/3.23 |

(Continued)

FOREIGN PATENT DOCUMENTS

| | | |
|---|---|---|
| CN | 101534374 A | 9/2009 |
| JP | A-2005-57767 | 3/2005 |
| JP | A-2005-305696 | 11/2005 |
| JP | A-2006-082460 | 3/2006 |
| JP | A-2006-262374 | 9/2006 |

OTHER PUBLICATIONS

Office Action issued on May 14, 2013 in counterpart Japanese Patent Application No. JP 2009-231761 (with English translation).

*Primary Examiner* — Richard Zhu
(74) *Attorney, Agent, or Firm* — Oliff PLC

(57) ABSTRACT

An image processor includes: a receiving unit that receives an input of image data in a first color space; a first color conversion unit that performs color conversion of the image data received by the receiving unit to image data formed of a first combination of color components in a second color space; a second color conversion unit that performs color conversion of the image data received by the receiving unit to image data formed of a second combination of color components in the second color space, the second combination being different from the first combination; and an image generating unit that generates an image based on at least the image data generated by the first and second color conversion units. Each of the first and second combinations includes a smaller number of color components than the number of color materials to be used in formation of an image.

12 Claims, 9 Drawing Sheets

(56) References Cited

U.S. PATENT DOCUMENTS

| | | | |
|---|---|---|---|
| 7,551,315 B2* | 6/2009 | Hoshii et al. | 358/1.2 |
| 7,764,411 B2* | 7/2010 | Kishimoto | 358/518 |
| 2002/0163669 A1* | 11/2002 | Yamazaki et al. | 358/3.23 |
| 2005/0018222 A1* | 1/2005 | Yoshida | 358/1.9 |
| 2005/0094871 A1* | 5/2005 | Berns et al. | 382/162 |
| 2005/0174586 A1* | 8/2005 | Yoshida et al. | 358/1.9 |
| 2006/0203269 A1* | 9/2006 | Murayama | 358/1.9 |
| 2009/0231646 A1 | 9/2009 | Yamauchi et al. | |

* cited by examiner

US 8,736,931 B2

IMAGE PROCESSOR, IMAGE FORMING SYSTEM, IMAGE PROCESSING METHOD AND COMPUTER READABLE MEDIUM

CROSS REFERENCE TO RELATED APPLICATIONS

This application is based on and claims priority under 35 USC §119 from Japanese Patent Application No. 2009-231761 filed Oct. 5, 2009.

BACKGROUND

1. Technical Field

The present invention relates to an image processor, an image forming system, an image processing method and a computer readable medium storing a program.

2. Related Art

In general, an image forming apparatus such as a color printer performs image formation processing by using color materials of cyan, magenta, yellow, black and the like. In this case, color properties of toners, inks or the like used as the color materials limit the color reproduction range (color gamut) of the image forming apparatus. Thus, techniques have been known which widen a color reproduction range by adding color materials having hue ranges different from those of cyan, magenta and yellow to improve color reproducibility.

SUMMARY

According to an aspect of the present invention, there is provided an image processor including: a receiving unit that receives an input of image data in a first color space; a first color conversion unit that performs color conversion of the image data in the first color space received by the receiving unit to image data formed of a first combination of color components in a second color space, the first combination of color components including a smaller number of color components than the number of color materials to be used in formation of an image; a second color conversion unit that performs color conversion of the image data in the first color space received by the receiving unit to image data formed of a second combination of color components in the second color space, the second combination of color components being different from the first combination of color components and including a smaller number of color components than the number of color materials to be used in formation of an image; and an image generating unit that generates an image based on at least the image data generated by the first color conversion unit and the image data obtained through the color conversion by the second color conversion unit.

BRIEF DESCRIPTION OF THE DRAWINGS

Exemplary embodiment(s) of the present invention will be described in detail based on the following figures, wherein:

FIGS. 6-1, 6-2 and 6-3 are flowcharts showing an example of details of color conversion processing performed in the color conversion processor;

DETAILED DESCRIPTION

An exemplary embodiment of the present invention will be described in detail below with reference to the accompanying drawings.

<Description of Entire Image Forming Apparatus>

Figure 1:
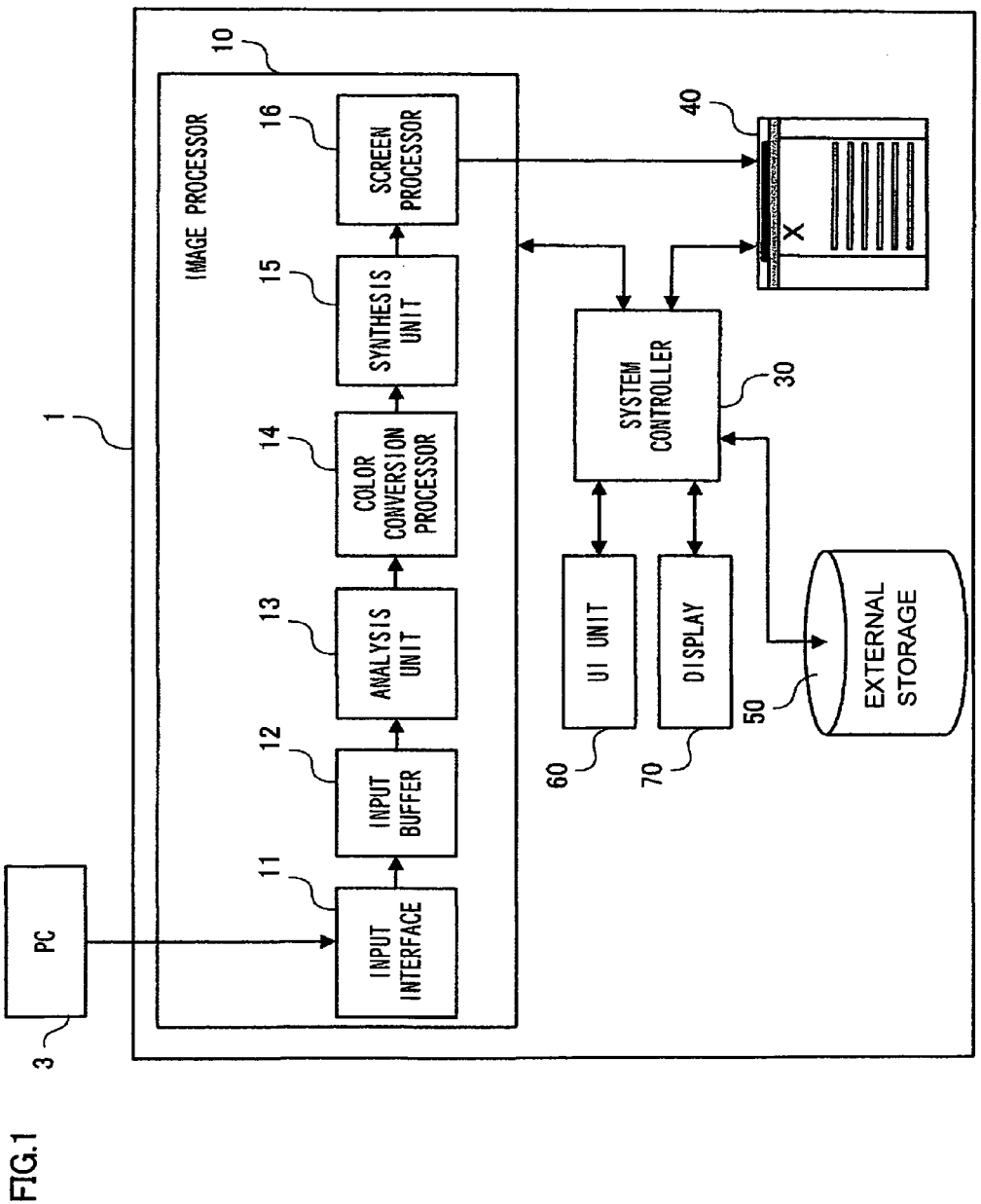
FIG. 1 is a diagram showing a configuration example of an image forming system including an image processor to which the exemplary embodiment is applied.

FIG. 1 is a diagram showing a configuration example of an image forming system 1 including an image processor 10 to which the exemplary embodiment is applied.

As shown in FIG. 1, the image forming system 1 is, for example, a digital color printer and includes the image processor 10 and a system controller 30. The image processor 10 is an example of an image processing unit (image processor) that performs image processing on print instruction data inputted from a personal computer (PC) 3. The system controller 30 controls operation of the entire image forming system 1. Moreover, the image forming system 1 includes an external storage 50 and an image forming function unit 40. The external storage 50 stores therein various programs such as an operating system (OS) and application software to be executed by the system controller 30. The image forming function unit 40 is an example of an image generating unit that generates an image on the basis of image data (an image signal) of each color component. As the image forming function unit 40, an image forming engine employing, for example, an electrophotographic method, an ink-jet method or the like is used.

Furthermore, the image forming system 1 includes a user interface (UI) unit 60 and a display 70. The UI unit 60 receives an input of various instructions from a user (for example, a user or the like of the image forming system 1). The display 70 notifies a user of various kind of information.

A configuration of the image forming system 1 may be such that the image forming system 1 includes an image reading apparatus and is configured as a digital color multifunction apparatus having a color copying function and a facsimile function.

<Description of Image Processor>

The image processor 10 includes an input interface 11, an input buffer 12 and an analysis unit 13. The input interface 11 is an example of a receiving unit that receives an input of a print instruction command (hereinafter, "print job") from the PC 3, for example. The input buffer 12 temporarily stores therein the print job received by the input interface 11. The analysis unit 13 analyzes the image data of a page description language (PDL) format included in the print job, and then expands (renders) the analyzed image data as image data for printing that is expressed by a group of pixels (such as bitmap data).

Additionally, the image processor 10 includes a color conversion processor 14, a synthesis unit 15 and a screen processor 16. The color conversion processor 14 performs color conversion processing on the rendered image data to generate image data of a color specification system (for example, image data of a CMYK color space) suitable for print processing in the image forming function unit 40. The synthesis unit 15 synthesizes the image data subjected to the color conversion processing. The screen processor 16 performs screen processing on the synthesized image data.

In the image processor 10, the input interface 11 receives a print job outputted from the PC 3, for example, and transmits the print job to the input buffer 12. The print job is written in the page description language (PDL) such as PostScript (registered trademark of Adobe Systems Incorporated in the U.S.), for example, and includes image data and attribute information. The image data includes color coordinate data that are coordinate information and color information, and the like. The attribute information includes information indicating a color format of image data included in a print command or a print job. As the attribute information indicating a color format, a print job has, for example, input color space information indicating a color space (input color space: a first color space) of the color information constituting the image data. The attribute information indicating a color format, together with object information indicating an object such as a character (text), a drawing (graphic) and a picture (image), is added to the print job. The attribute information indicating a color format includes information on an RGB color, a CMYK color and a Commission Internationale de l'Eclairage (CIE) color, which has a color profile. Additionally, the attribute information indicating a color format includes information on a color number of Pantone, Inc. in the U.S. (hereinafter, "Pantone color"), a color number of DIC Corporation and a color number of TOYO INK MFG. CO. ,LTD. in Japan, which are used for designating a color with spot color information indicating designation of a special color (hereinafter, "spot color") such as a corporate color and a gold color, for example, and further includes information on a gray (black and white).

The input buffer 12 temporarily stores the print job acquired from the input interface 11, and outputs the print job to the analysis unit 13.

The analysis unit 13 acquires the print job from the input buffer 12. The analysis unit 13 then performs rendering processing on image data while analyzing the image data of the PDL format included in the acquired print job, to generate image data of a bitmap format (bitmap data) in accordance with a color plate in an output color space (second color space) used for print processing in the image forming function unit 40. The flow of processing on image data of the PDL format is typically such that the analysis unit 13 performs processing like a language processing system of an interpreter type. In the flow of processing, an output image is rendered while data is sequentially analyzed, finally to obtain image data corresponding to each color plate of an output page. Therefore, a way to compose the processing and an order of the processing are not limited to the following.

The analysis unit 13 determines a color format of each object on the basis of the attribute information indicating the color format of image data. For example, in a case of image data whose object is "image," the color format of the "image" is determined. The same holds true for a case where the object is "text" or "graphic" (line, filling-in and the like). The analysis unit 13 determines whether a color format of each object of image data is the one that is formed in a device RGB color space or a device CMYK color space, for example, that is a CIE color formed in an L*a*b* color space, for example, that is a gray formed of an achromatic color having only lightness, or that is formed of a spot color. Recently, an sRGB color space is taken as a substituting color space of a device RGB color space, in some case.

The analysis unit 13 then renders an object to generate bitmap, and outputs information on the determined color format of each object to the color conversion processor 14.

The color conversion processor 14 performs color conversion processing on the bitmap data generated by the analysis unit 13 in accordance with the color format for each object. The color conversion processor 14 then outputs, to the synthesis unit 15, the bitmap data subjected to the color conversion processing.

The synthesis unit 15 synthesizes the image data of each color plate subjected to the color conversion processing in accordance with the color format for each object by the color conversion processor 14, thereby to generate image data of each color plate for a page, for example.

The screen processor 16 performs screen processing on the image data (multi-valued bitmap data) transmitted from the synthesis unit 15, thereby to generate binary image data (1-bit image data). Specifically, on the basis of the bitmap data, which is multi-valued image information having a gray scale for each color component, the screen processor 16 generates binary image data spuriously representing the density of a halftone image by using colored dots, called halftone dots, each having a corresponding size. Then, the screen processor 16 outputs the generated binary image data to the image forming function unit 40.

Note that the screen processor 16 may be included in the image forming function unit 40, and the screen processor 16 and the image processor 10 may be interfaced with multi-valued bitmap data.

Additionally, the image processor 10 may be integrally configured with the system controller 30, the image forming function unit 40 and the like, or may be configured separately from the system controller 30, the image forming function unit 40 and the like. In the case of configuring the image processor 10 separately, the image processor 10 is connected to each of the system controller 30, the image forming function unit 40 and the like with a dedicated high speed interface or via a local area network (LAN), for example.

Figure 2:
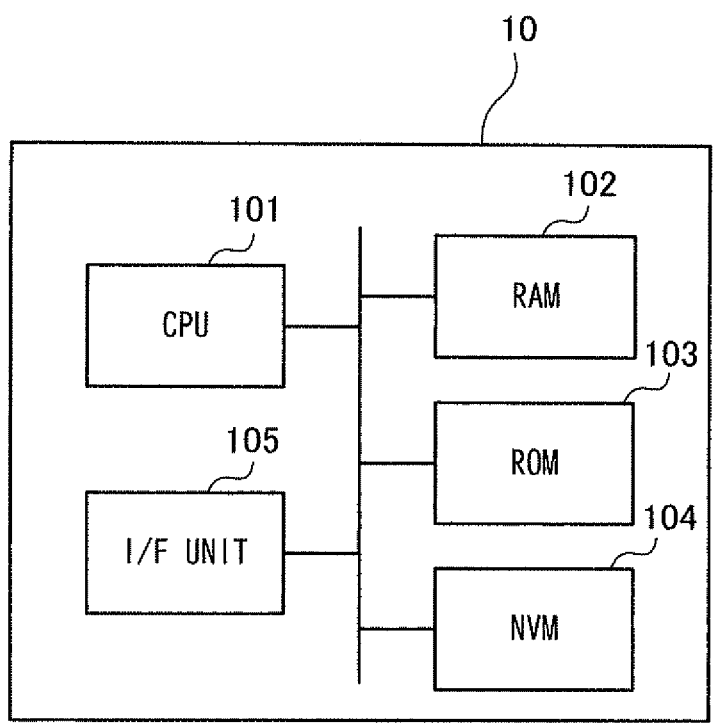
FIG. 2 is a block diagram showing an internal configuration of the image processor.

FIG. 2 is a block diagram showing an internal configuration of the image processor 10. As shown in FIG. 2, the image processor 10 is provided with a CPU 101, a RAM 102, a ROM 103, a non-volatile memory (NVM) 104 and an interface (I/F) unit 105. The CPU 101 executes digital calculation processing in accordance with a processing program set in advance, for processing a print job. The RAM 102 is used as a working memory or the like for the CPU 101. The ROM 103 stores therein various setting values used in the processing in the CPU 101. The non-volatile memory (NVM) 104, such as a flash memory, is a rewritable, holds data even in a case where the power supply is stopped, and is backed up by a battery. The I/F unit 105 controls an input and an output of signals with an external device such as the PC 3, an image reading apparatus or the like connected to the image processor 10, and with each of configuration units such as the system controller 30, the image forming function unit 40 and the like.

The CPU 101 reads the processing program for processing a print job from the external storage 50, and loads it into a main memory (RAM 102), and achieves functions of the analysis unit 13, the color conversion processor 14, the synthesis unit 15, the screen processor 16, and the like.

Note that, as another provision method on this processing program, the program may be provided while being prestored in the ROM 103, and be loaded into the RAM 102. In addition, when an apparatus is provided with a rewritable ROM 103 such as an EEPROM, only this program may be installed in the ROM 103 after the CPU 101 is set, and then may be loaded into the RAM 102. Moreover, this program may also be transmitted to the image processor 10 through a network such as the Internet, and then installed in the ROM 103 of the image processor 10, and further loaded into the RAM 102. In addition, the program may be loaded into the RAM 102 from an external recording medium such as a DVD-ROM, a flash memory or the like.

Figure 3:
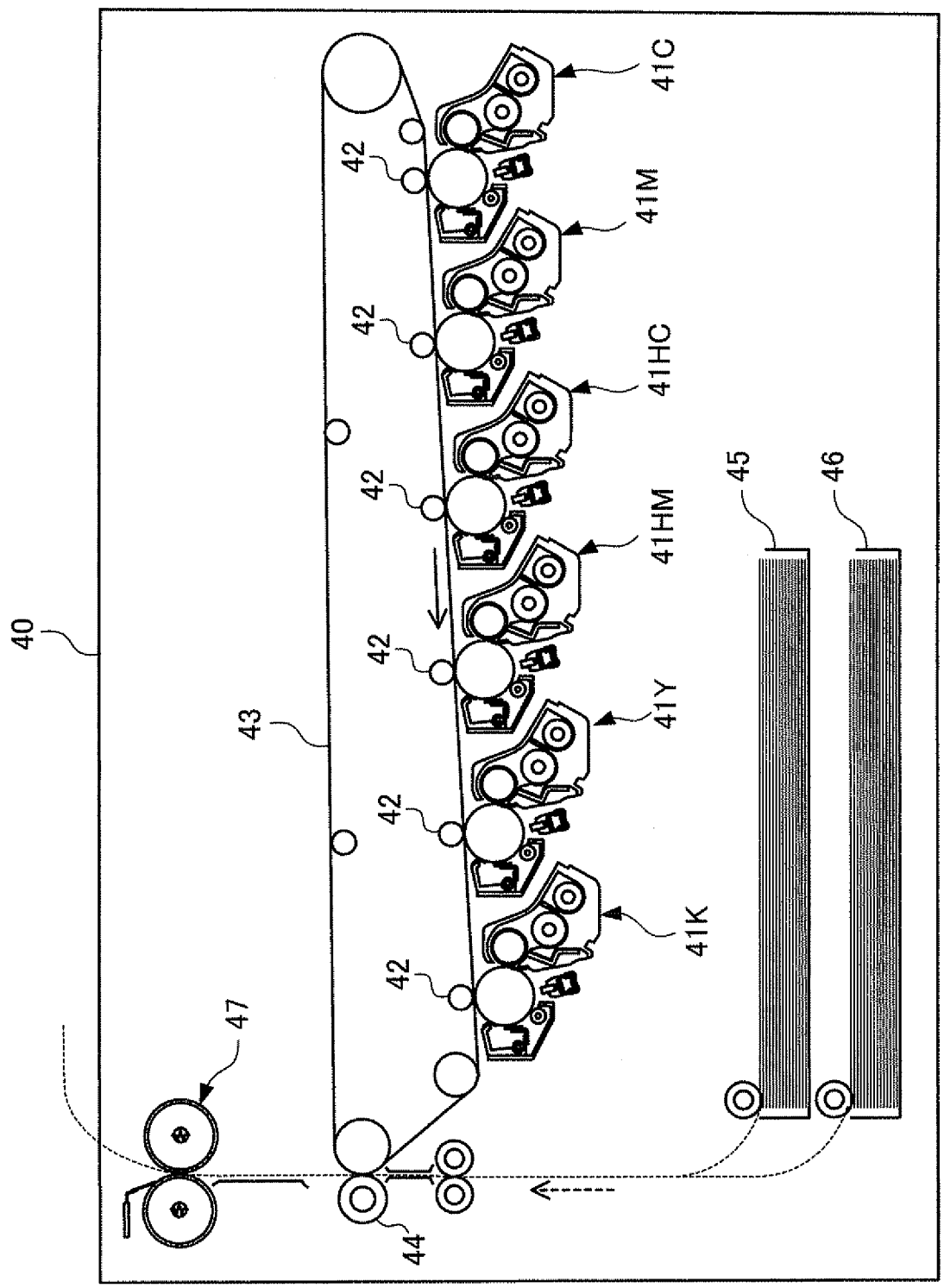
FIG. 3 is a diagram illustrating a configuration of an image forming function unit.

Next, FIG. 3 is a diagram illustrating a configuration of the image forming function unit 40.

The image forming function unit 40 has a configuration of six-color development in which toners of six colors of C (cyan), M (magenta), HC (high chroma cyan), HM (high chroma magenta), Y (yellow) and K (black), for example, are used as toners, which are an example of color materials. Specifically, the image forming function unit 40 includes six image forming units 41C, 41M, 41HC, 41HM, 41Y and 41K (hereinafter, also collectively referred to as "image forming units 41") that form toner images of the respective colors with the, electrophotographic method, for example. The image forming units 41 sequentially form six color toner images of the C, M, HC, HM, Y and K colors. The HC color herein has a C-based hue, and is a cyan that has lighter color tone and relatively higher chroma than the C color. The HM color herein has an M-based hue, and is a magenta that has lighter color tone and relatively higher chroma than the M color.

In the image forming function unit 40, the respective color toner images formed by the image forming units 41 are electrostatically transferred one after another onto an intermediate transfer belt 43 by primary transfer rolls 42, thereby to form composite toner images in which the respective color toner images are superposed with each other. The composite toner images on the intermediate transfer belt 43 are transported to a region where a secondary transfer roll 44 is arranged, along with the movement of the intermediate transfer belt 43 (in the direction indicated by the solid arrow). Then, the composite toner images are electrostatically transferred at a time onto the sheet supplied from a sheet holding unit 45 or 46 (in the direction indicated by the broken arrow). After that, the composite toner images having been electrostatically transferred onto the sheet are fixed on the sheet by being subjected to fixing processing using heat and pressure by a fixing device 47.

In this way, the image formation processing in the image forming system 1 is repeatedly performed for a designated number of print sheets.

[First Exemplary Embodiment]
<Description of Color Conversion Processor>

Next, a description will be given of an exemplary embodiment of the color conversion processor 14 included in the above-described image processor 10. The color conversion processor 14 of the present exemplary embodiment converts image data into color coordinate data (image data) in an output color space (second color space) of the image forming function unit 40 by using color conversion factors (hereinafter, "a color conversion profile (a file including description of a table used for color conversion to perform color reproduction matching between devices)"), and is provided with plural color conversion profiles in advance. Here, the color conversion profiles are set respectively for different combinations (hereinafter, "four-color sets") of four color materials (toners in the present exemplary embodiment) to be used in image formation. For example, the color conversion processor 14 has: a color conversion profile for converting image data to a "first four-color set" formed of a C color, an M color, a Y color and a K color constituting a color reproduction range (hereinafter, "color gamut") with ordinary tone; and a color conversion profile for converting image data to a "second four-color set" formed of an HC color, an HM color, the Y color and the K color constituting a color gamut with tone lighter than ordinary tone and with high chroma. For image data included in a print job received by the input interface 11, the color conversion processor 14 selects and uses, for example, one of the color conversion profile for conversion to the "first four-color set" and the color conversion profile for conversion to the "second four-color set" in accordance with the color format (format of color information constituting the image data) of this image data.

Note that the "first four-color set" is an example of a first combination of plural color components, while the "second four-color set" is an example of a second combination of plural color components.

For a pixel for which the color conversion processor 14 has selected the color conversion profile for conversion to the "first four-color set" and has performed color conversion, the image forming function unit 40 performs image formation using the image forming units 41C, 41M, 41Y and 41K that form color toner images of the C, M, Y and K colors, respectively. On the other hand, for a pixel for which the color conversion processor 14 has selected the color conversion profile for conversion to the "second four-color set" and has performed color conversion, the image forming function unit 40 performs image formation using the image forming units 41HC, 41HM, 41Y and 41K that form color toner images of the HC, HM, Y and K colors, respectively.

Figure 4:
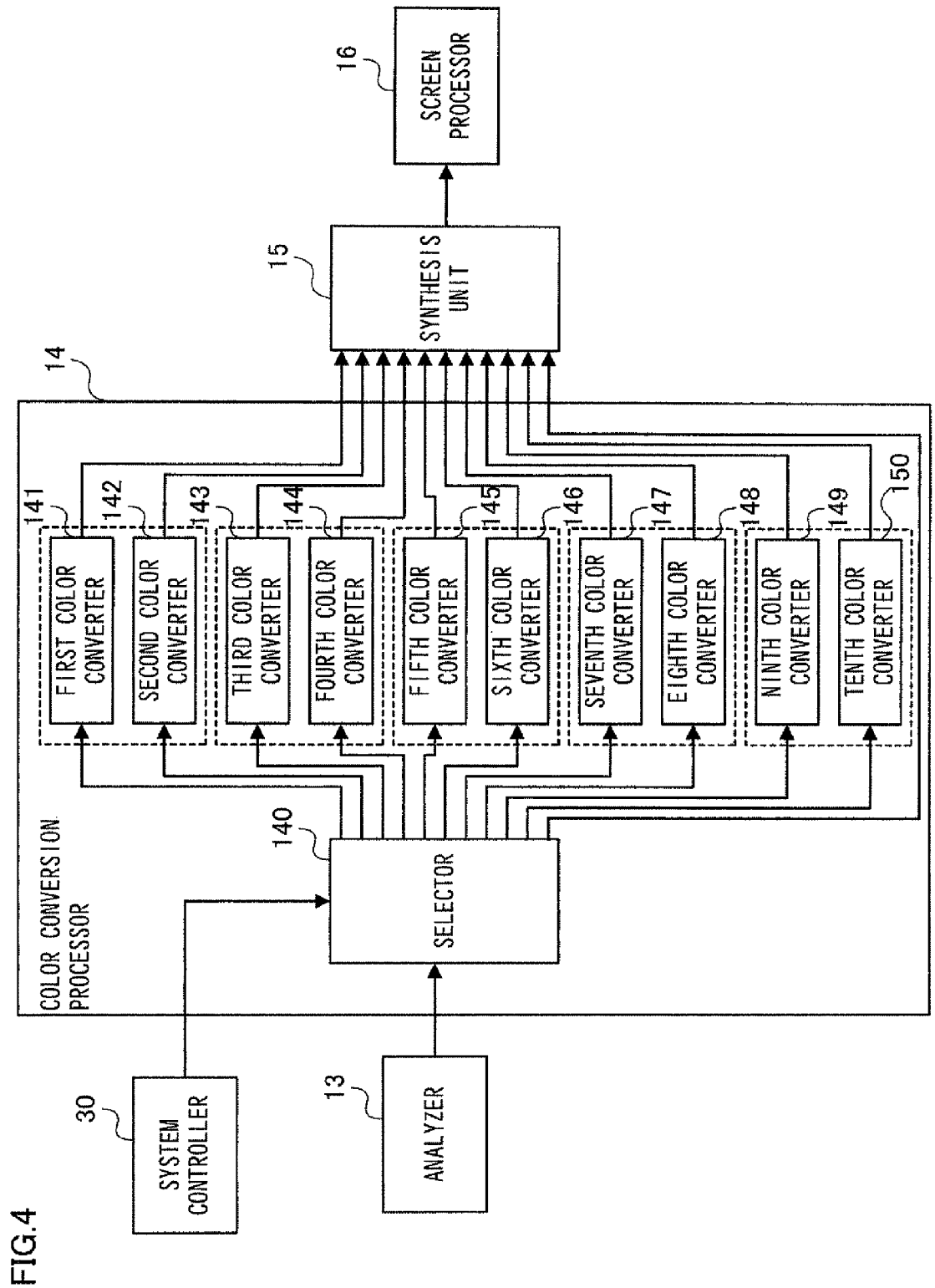
FIG. 4 is a block diagram showing a configuration of a color conversion processor according to the first exemplary embodiment.

Next, FIG. 4 is a block diagram showing a configuration of the color conversion processor 14 of the present exemplary embodiment.

As shown in FIG. 4, the color conversion processor 14 includes a first color converter 141, a second color converter 142, a third color converter 143, a fourth color converter 144, a fifth color converter 145, a sixth color converter 146, a seventh color converter 147, an eighth color converter 148, a ninth color converter 149 and a tenth color converter 150 that perform the color conversion of image data by using different color conversion factors (color conversion profiles), respectively.

The color conversion processor 14 further includes a selector 140. The selector 140 acquires, from the analysis unit 13, image data and information on the color format of the image data that is set for each object. Based on the acquired information on the color format of the image data, the color conversion processor 14 selects one of the first to tenth color converters 141 to 150 that is used for color conversion, or selects not to perform color conversion. Moreover, the color conversion processor 14 outputs the image data to the selected one of the first to tenth color converters 141 to 150 or the synthesis unit 15.

<Description of Each Color Converter>

The first color converter 141, which is an example of a first color conversion unit, performs the color conversion of the image data from the analysis unit 13 by using a "first color conversion profile" for converting color coordinate data in a device RGB color space to color coordinate data in the output color space (second color space) of the image forming function unit 40. The first color conversion profile herein includes a color conversion profile for converting color coordinate data (R, G, B) in the device RGB color space to color coordinate data (C, M, Y, K) for the "first four-color set" representing ordinary tone.

The second color converter 142, which is an example of a second color conversion unit, performs the color conversion of the image data from the analysis unit 13 by using a "second color conversion profile" for converting color coordinate data in the device RGB color space to color coordinate data in the output color space of the image forming function unit 40. The second color conversion profile herein is set so that color coordinate data (R, G, B) in the device RGB color space may be converted to color coordinate data (HC, HM, Y, K) for the "second four-color set" that makes tone relatively light.

The third color converter 143, which is an example of the first color conversion unit, performs the color conversion of the image data from the analysis unit 13 by using a "third color conversion profile" for converting color coordinate data in the device-independent sRGB color space to color coordinate data in the output color space of the image forming function unit 40. The third color conversion profile herein includes the following color conversion profiles: a color conversion profile for converting color coordinate data (R, G, B) in the sRGB color space to color coordinate data (L*, a*, b*) in an L*a*b* color space; and a color conversion profile for converting the color coordinate data (L*, a*, b*) in the L*a*b* color space to color coordinate data (C, M, Y, K) for the "first four-color set" representing ordinary tone.

The fourth color converter 144, which is an example of the second color conversion unit, performs the color conversion of the image data from the analysis unit 13 by using a "fourth color conversion profile" for converting color coordinate data in the device-independent sRGB color space to color coordinate data in the output color space of the image forming function unit 40. The fourth color conversion profile herein includes the following color conversion profiles: a color conversion profile for converting the color coordinate data (R, G, B) in the sRGB color space to color coordinate data (L*, a*, b*) in the L*a*b* color space, which is a luminance and color-difference space; and a color conversion profile for converting color coordinate data (L*, a*, b*) in the L*a*b* color space to color coordinate data (HC, HM, Y, K) for the "second four-color set" that makes tone relatively light.

The fifth color converter 145, which is an example of the first color conversion unit, performs the color conversion of the image data from the analysis unit 13 by using a "fifth color conversion profile" for converting color coordinate data in the L*a*b* color space, which is a luminance and color-difference space, to color coordinate data in the output color space of the image forming function unit 40. The fifth color conversion profile herein includes a color conversion profile for converting color coordinate data (L*, a*, b*) in the L*a*b* color space to color coordinate data (C, M, Y, K) for the "first four-color set" representing ordinary tone.

The sixth color converter 146, which is an example of the second color conversion unit, performs the color conversion of the image data from the analysis unit 13 by using a "sixth color conversion profile" for converting color coordinate data in the L*a*b* color space, which is a luminance and color-difference space, to color coordinate data in the output color space of the image forming function unit 40. The sixth color conversion profile herein includes a color conversion profile for converting color coordinate data (L*, a*, b*) in the L*a*b* color space to color coordinate data (HC, HM, Y, K) for the "second four-color set" that makes tone relatively light.

The seventh color converter 147, which is an example of the first color conversion unit, performs the color conversion of the image data from the analysis unit 13 by using a "seventh color conversion profile" for converting a spot color (for example, Pantone color) to color coordinate data in the output color space of the image forming function unit 40. The seventh color conversion profile herein includes a color conversion profile for converting a Pantone color specified by a number (for example, No. 1000) to color coordinate data (C, M, Y, K) for the "first four-color set" representing ordinary tone.

The eighth color converter 148, which is an example of the second color conversion unit, performs the color conversion of the image data from the analysis unit 13 by using an "eighth color conversion profile" for converting a Pantone color to color coordinate data in the output color space of the image forming function unit 40. The eighth color conversion profile herein includes a color conversion profile for converting a Pantone color to color coordinate data (HC, HM, Y, K) for the "second four-color set" that makes tone relatively light.

The ninth color converter 149, which is an example of the first color conversion unit, performs the color conversion of the image data from the analysis unit 13 by using a "ninth color conversion profile" for converting color coordinate data in a device CMYK color space to color coordinate data in the output color space of the image forming function unit 40. The ninth color conversion profile herein is set so that color coordinate data (C, M, Y, K) in the device CMYK color space may be converted to color coordinate data (C, M, Y, K) for the "first four-color set" representing ordinary tone.

The tenth color converter 150, which is an example of the second color conversion unit, performs the color conversion of the image data from the analysis unit 13 by using a "tenth color conversion profile" for converting color coordinate data in the device CMYK color space to color coordinate data in the output color space of the image forming function unit 40. In this case, the device CMYK color space is represented in a general print range. Accordingly, the tenth color conversion profile includes a color conversion profile for converting color coordinate data (C, M, Y, K) in the device CMYK color space to color coordinate data (HC, HM, Y, K) for the "second four-color set" that makes tone relatively light.

<Description of Selector>

Based on the information, on the color format of each object, acquired from the analysis unit 13, the selector 140 selects one of the first to tenth color converters 141 to 150 to be used to perform the color conversion of the image data. However, in the case where the information, on the color format, acquired from the analysis unit 13 is information indicating that the image data includes achromatic colors having only lightness, color conversion processing in the first to tenth color converters 141 to 150 is not necessary. For this reason, the image data is outputted directly to the synthesis unit 15. However, in some cases, a configuration may also be employed in which even achromatic-color signals are subjected to gray-level conversion in accordance with characteristics of output K signals.

In the selector 140, color converters (the first to tenth color converters 141 to 150) to be selected in accordance with the color format of the image data are set in advance as default settings (defaults) as follows.

(1) If the analysis unit 13 has determined that the color space constituting the image data is the device RGB color space, the selector 140 selects the second color converter 142.

In general, an image represented in, for example, a monitor or the like in which the device RGB color space is used is light-toned (lightness and chroma are relatively high). Accordingly, for image data formed in the device RGB color space, the default setting is to select the second color converter 142 having set therein the second color conversion profile for conversion to color coordinate data (HC, HM, Y, K) for the "second four-color set" that makes tone relatively light and that makes chroma relatively high.

(2) If the analysis unit 13 has determined that the color space constituting the image data is the sRGB color space, the default setting is to select the fourth color converter 144 from a reason similar to that in (1). The same is true in the case of dealing with the sRGB color space as alternative characteristics of the device RGB color space.

(3) If the analysis unit 13 has determined that the color space constituting the image data is the L*a*b* color space, the selector 140 selects the fifth color converter 145.

The L*a*b* color space is a colorimetric system defined by Commission Internationale de l'Eclairage. Since it is impossible to generally determine from the nature of the data which four-color set is suitable, conversion to color coordinate data (C, M, Y, K) for the "first four-color set" is assumed. Thus, the default setting is to select the fifth color converter 145 having set therein the fifth color conversion profile.

(4) If the analysis unit 13 has determined that colors constituting the image data are Pantone colors, the selector 140 selects the seventh color converter 147.

Many of Pantone colors are irreproducible with color coordinate data (C,

M, Y, K) for the "first four-color set," which is generally used. Moreover, many of Pantone colors are irreproducible even with color coordinate data (HC, HM, Y, K) for the "second four-color set" that makes tone relatively light. For these reasons, the default setting is to select the seventh color converter 147 having set therein the seventh color conversion profile for tentative conversion to color coordinate data (C, M, Y, K) for the "first four-color set" as data for reproducing approximate colors of such Pantone colors. The decision is left to the selection by a user in accordance with the types of Pantone colors.

(5) If the analysis unit 13 has determined that the color space constituting the image data is the device CMYK color space, the selector 140 selects the ninth color converter 149.

The device CMYK color space is usually a color space representing a color reproduction range in general printing. Accordingly, for image data in the device CMYK color space, the default setting is to select the tenth color converter 150 having set therein the tenth color conversion profile for conversion to color coordinate data (C, M, Y, K) for the "first four-color set" representing ordinary tone.

Meanwhile, the image forming system 1 receives, via the UI unit 60 (see FIG. 1), from the user, a setting change (manual setting) concerning whether a color conversion profile for conversion to color coordinate data (C, M, Y, K) for the "first four-color set" or a color conversion profile for conversion to color coordinate data (HC, HM, Y, K) for the "second four-color set" is used. In this case, instruction information concerning a setting change received by the UI unit 60 from the user is transferred to the selector 140 of the color conversion processor 14 by the system controller 30 (see FIG. 1).

(1') In the case where the user has issued a setting change instruction by manual setting, if the analysis unit 13 has determined that the color space constituting the image data is the device RGB color space, the selector 140 selects the first color converter 141. Thus, the color coordinate data (R, G, B) in the device RGB color space is converted to color coordinate data (C, M, Y, K) for the "first four-color set" representing ordinary tone.

(2') In the case where the user has issued a setting change instruction by manual setting, if the analysis unit 13 has determined that the color space constituting the image data is the sRGB color space, the selector 140 selects the third color converter 143. Thus, the color coordinate data (R, G, B) in the sRGB color space is converted to color coordinate data (C, M, Y, K) for the "first four-color set" representing ordinary tone.

(3') In the case where the user has issued a setting change instruction by manual setting, if the analysis unit 13 has determined that the color space constituting the image data is the L*a*b* color space, the selector 140 selects the sixth color converter 146. Thus, the color coordinate data (L*, a*, b*) in the L*a*b* color space is converted to color coordinate data (HC, HM, Y, K) for the "second four-color set" that makes tone relatively light.

(4') In the case where the user has issued a setting change instruction by manual setting, if the analysis unit 13 has determined that colors constituting the image data are Pantone colors, the selector 140 selects the eighth color converter 148. Thus, the Pantone colors are converted to color coordinate data (HC, HM, Y, K) for the "second four-color set" that makes tone relatively light and that makes chroma relatively high.

(5') In the case where the user has issued a setting change instruction by manual setting, if the analysis unit 13 has determined that the color space constituting the image data is the device CMYK color space, the selector 140 selects the tenth color converter 150. Thus, the color coordinate data (C, M, Y, K) in the device CMYK color space is converted to color coordinate data (HC, HM, Y, K) for the "second four-color set" that makes tone relatively light and that makes chroma relatively high.

As described above, a typical setting (default setting) that is assumed to be generally used is set in advance to the color converter (one of the first to tenth color converters 141 to 150) to be selected in accordance with each color format by the selector 140. Furthermore, settings are freely changeable in accordance with the intention of the user. This enables the user to freely select a color conversion profile corresponding to the color format of the image data.

Note that the analysis unit 13 and the selector 140 function as a selection unit that selects one of the first color conversion unit and the second color conversion unit in accordance with the color format of the image data in the first color space.

As described above, the color conversion processor 14 of the present exemplary embodiment includes the following color conversion profiles: the color conversion profiles for conversion to the "first four-color set" formed of the C, M, Y and K colors constituting the color gamut with ordinary tone; and the color conversion profiles for conversion to the "second four-color set" formed of the HC, HM, Y and K colors constituting the color gamut with tone relatively lighter than ordinary tone. For image data included in a print job, the color conversion processor 14 selects and uses one of the color conversion profiles for conversion to the "first four-color set" and the color conversion profiles for conversion to the "second four-color set" in accordance with the color format of the image data.

<Description of Synthesis Unit>

The synthesis unit 15 synthesizes, for each pixel (each image area), the image data obtained by the color conversion in one of the first to tenth color converters 141 to 150 and the image data which includes achromatic colors and which has been sent without being subjected to color conversion into each four-color-plate data obtained by the color conversion in the first and second color conversion units, thus creating six color plates. Each of the color plates created for the HC, HM, C and M colors includes only image data generated by the color conversion in any one of the first and second color conversion units. However, color plate data created for each of the Y and K colors is outputted as a color plate from each of the first and second color conversion units. Thus, for each of the Y and K colors, two color plates are synthesized to generate a color plate. The image data thus synthesized into six color plates is used.

For a pixel for which color conversion has been performed with the color conversion profile for conversion to the "first four-color set" selected, the image forming function unit 40 performs image formation using the image forming units 41C, 41M, 41Y and 41K that form color toner images of the C, M, Y and K colors, respectively. On the other hand, for a pixel for which color conversion has been performed with the color conversion profile for conversion to the "second four-color set" selected, the image forming function unit 40 performs image formation using the image forming units 41HC, 41HM, 41Y and 41K that form color toner images of the HC, HM, Y and K colors, respectively.

Thus, with each of the color conversion profiles for conversion to the "first four-color set" and the "second four-color set," color conversion to an output color space always including four colors is performed. Accordingly, unlike the case where color conversion to an output color space including, for example, six colors (C, M, HC, HM, Y and K colors) is collectively performed, image formation processing (color conversion processing) is achieved with a configuration equivalent to that for conventional four-color separation processing. Further, since one of a color conversion profile for conversion to the "first four-color set" and a color conversion profile for conversion to the "second four-color set" is selected in accordance with the color format of the inputted image data, color reproduction is performed in an output color space corresponding to the colors of the inputted image data. Accordingly, color reproducibility is improved.

<Description of Another Configuration Example of Synthesis Unit>

Consider a configuration in which a document described in PostScript, a general page description language, is translated to create page images. In this configuration, synthesis may be performed as follows: storing page images of six plates (C, M, Y, K, HC, HM) as memory in advance; determining the color formats of described objects, while analyzing described codes; performing color separation into the above-described "first four-color set" or "second four-color set"; and sequentially drawing data on page images of the corresponding four plates among the six plates. If the color format is a gray, data is drawn in a K plate.

Figure 5:
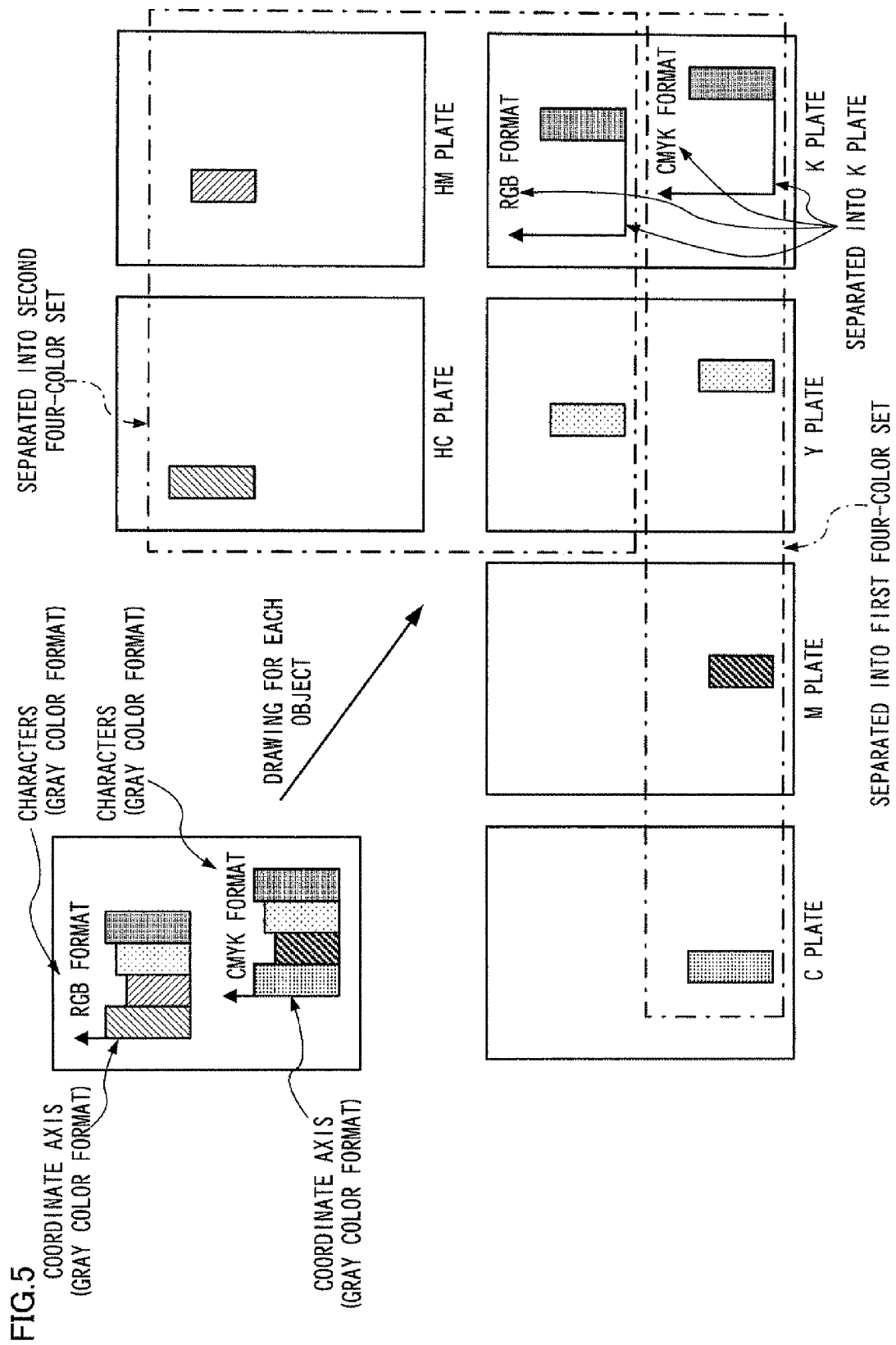
FIG. 5 is a conceptual diagram explaining generation of a synthesized image.

FIG. 5 shows a conceptual diagram for explanation. In FIG. 5, a graph part in the CMYK format, a graph part in the RGB format, and characters and coordinate axis parts in the gray color format are respectively separated into the "first four-color set," the "second four-color set," and a K plate to be sequentially drawn and then synthesized together.

In the translation of a PostScript document, objects and the like are drawn in page images in the order of description, and therefore written in the corresponding plates in an overwrite (synthesized) manner.

Until the end of the document, a process is repeated which includes, for each of objects sequentially translated, determining the color format thereof and selecting parameters for color separation.

<Description of Color Conversion Processing Performed in Color Conversion Processor>

FIGS. 6-1, 6-2 and 6-3 are flowcharts showing an example of details of color conversion processing performed in the color conversion processor 14.

Figures 1, 6:
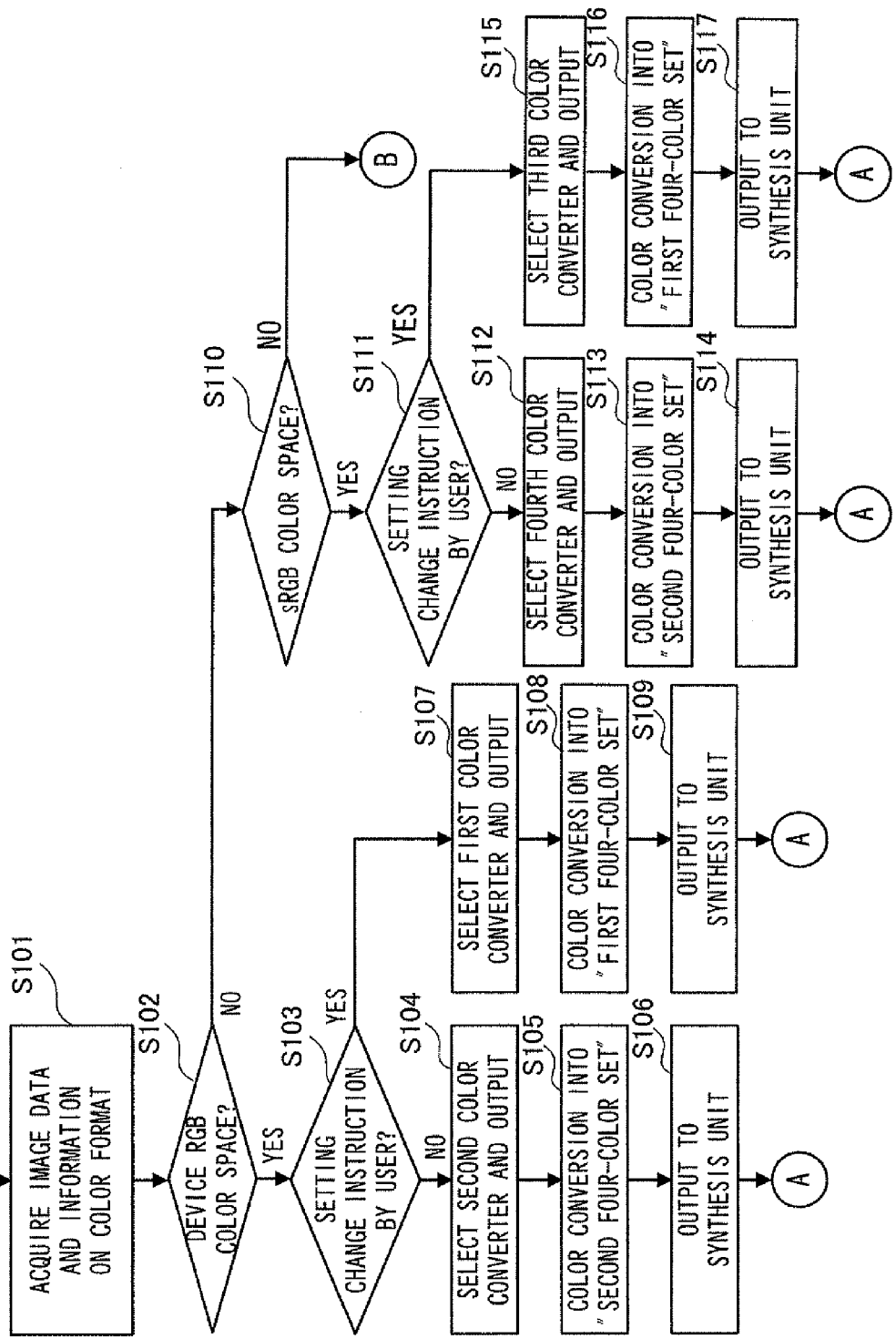
Figures 2, 6:
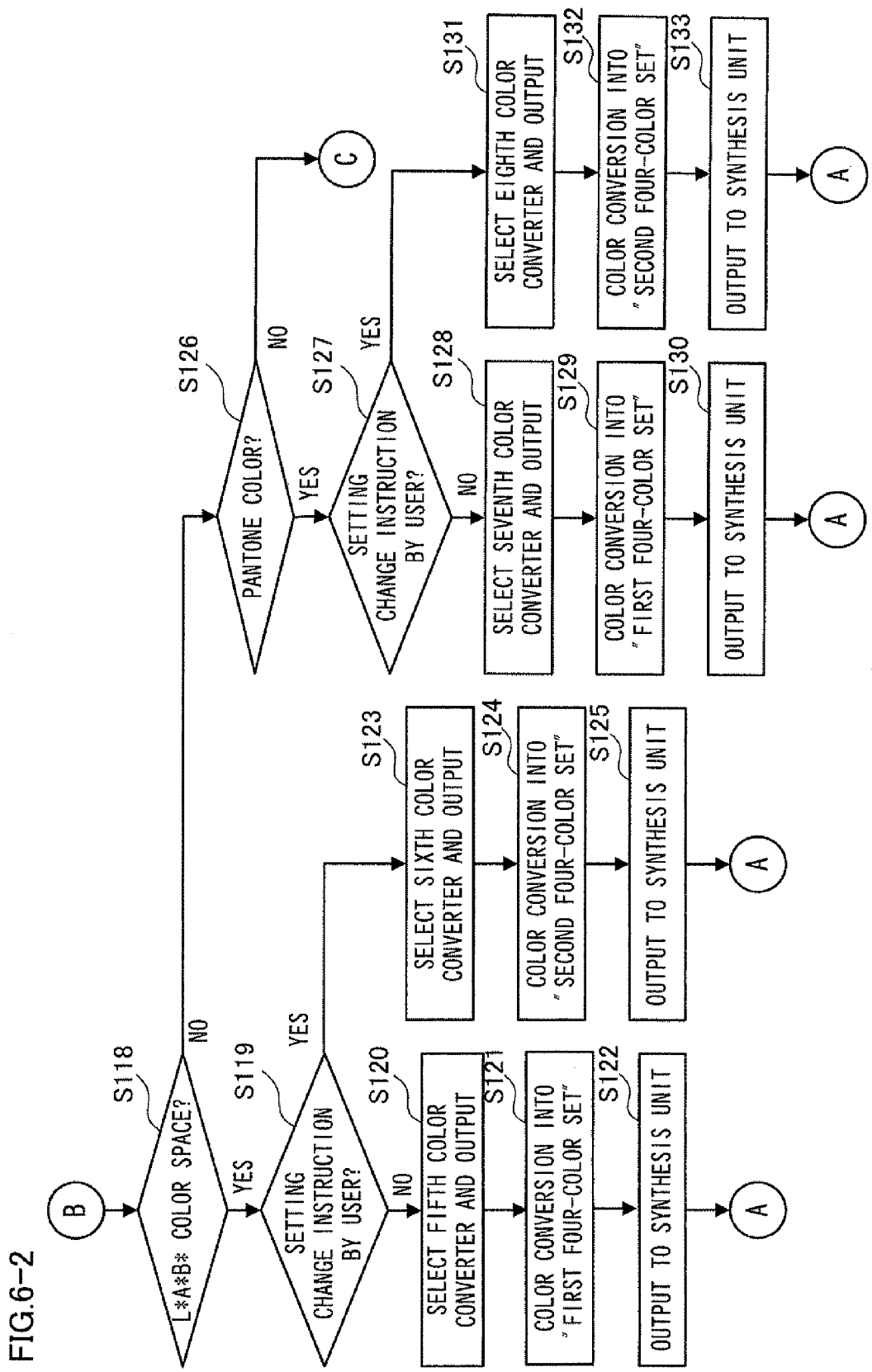
Figures 3, 6:
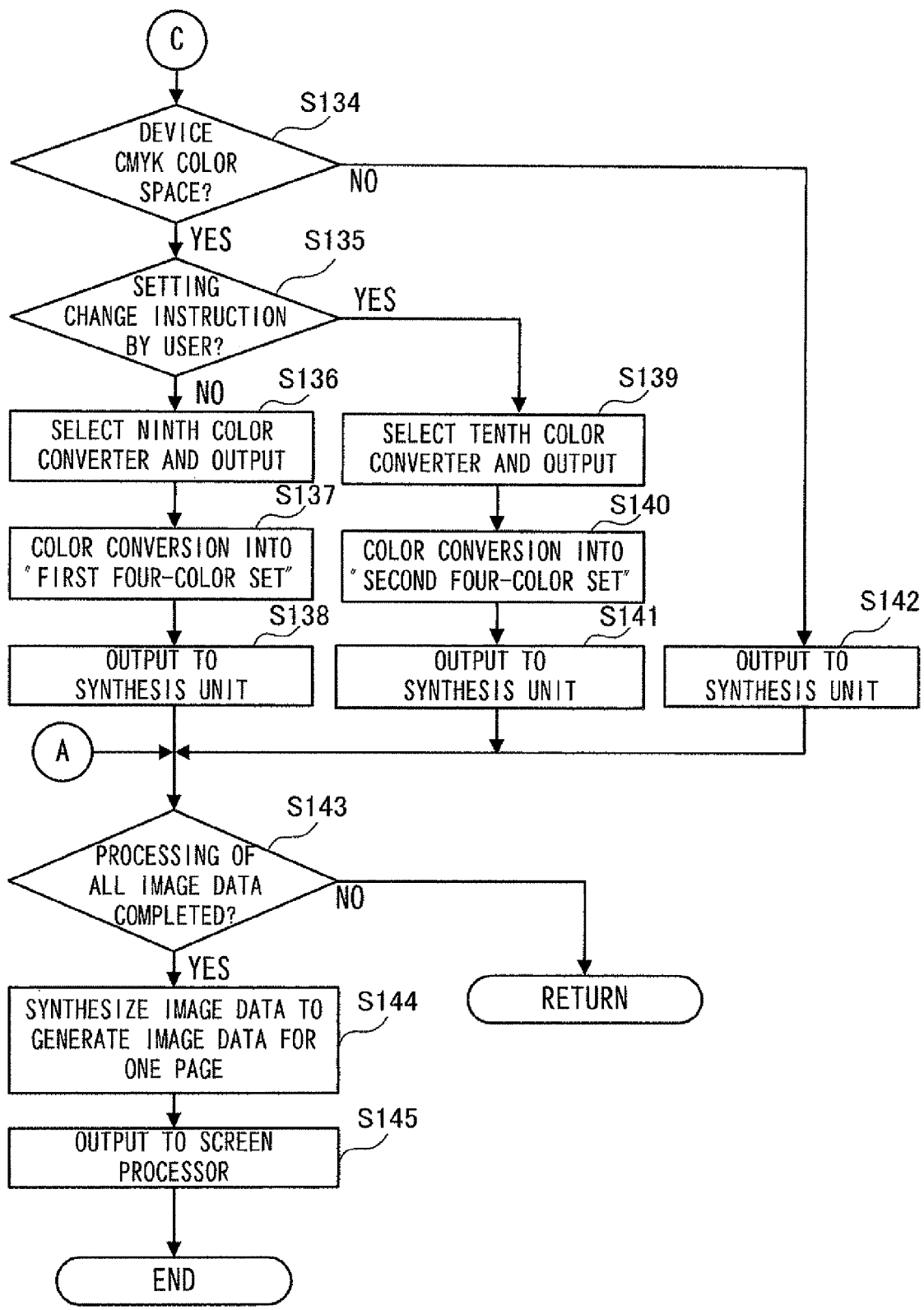

First, as shown in FIG. 6-1, the color conversion processor 14 acquires image data (data on each pixel in bitmap data) and information on the color format of each object concerning the image data, from the analysis unit 13 (Step 101). If the selector 140 has acquired, as information on the color format from the analysis unit 13, information indicating that the image data is formed in the device RGB color space (Yes in Step 102), and has not received from the system controller 30 a setting change instruction issued by the user for image data formed in the device RGB color space (No in Step 103), the selector 140 selects the second color converter 142, which is a default setting, as a destination of the image data, and outputs information thereto (Step 104).

This causes the second color converter 142 to perform the color conversion of image data formed of color coordinate data (R, G, B) in the device RGB color space into image data formed of color coordinate data (HC, HM, Y, K) for the "second four-color set" by using the second color conversion profile (Step 105). Then, the second color converter 142 outputs the image data obtained by the color conversion to the synthesis unit 15 (Step 106).

On the other hand, if the selector 140 has received from the system controller 30 a setting change instruction issued by the user for image data formed in the device RGB color space (Yes in Step 103), the selector 140 selects the first color converter 141 as a destination of the image data, and outputs information thereto (Step 107).

This causes the first color converter 141 to perform the color conversion of image data formed of color coordinate data (R, G, B) in the device RGB color space into image data formed of color coordinate data (C, M, Y, K) for the "first four-color set" by using the first color conversion profile (Step 108). Then, the first color converter 141 outputs the image data obtained by the color conversion to the synthesis unit 15 (Step 109).

Subsequently, if the selector 140 has acquired, as information on the color format from the analysis unit 13, information indicating that the image data is formed in the sRGB color space (No in Step 102 and Yes in Step 110), and has not received from the system controller 30 a setting change instruction issued by the user for image data formed in the sRGB color space (No in Step 111), the selector 140 selects the fourth color converter 144, which is a default setting, as a destination of the image data, and outputs information thereto (Step 112).

This causes the fourth color converter 144 to perform the color conversion of image data formed of color coordinate data (R, G, B) in the sRGB color space into image data formed of color coordinate data (HC, HM, Y, K) for the "second four-color set" by using the fourth color conversion profile (Step 113). Then, the fourth color converter 144 outputs the image data obtained by the color conversion to the synthesis unit 15 (Step 114).

On the other hand, if the selector 140 has received from the system controller 30 a setting change instruction issued by the user for image data formed in the sRGB color space (Yes in Step 111), the selector 140 selects the third color converter 143 as a destination of the image data, and outputs information thereto (Step 115).

This causes the third color converter 143 to perform the color conversion of image data formed of color coordinate data (R, G, B) in the sRGB color space into image data formed of color coordinate data (C, M, Y, K) for the "first four-color set" by using the third color conversion profile (Step 116). Then, the third color converter 143 outputs the image data obtained by the color conversion to the synthesis unit 15 (Step 117).

Referring now to the next drawing, FIG. 6-2, if the selector 140 has acquired, as information on the color format from the analysis unit 13, information indicating that the image data is formed in the L*a*b* color space (No in Step 110 and Yes in Step 118), and has not received from the system controller 30 a setting change instruction issued by the user for image data formed in the L*a*b* color space (No in Step 119), the selector 140 selects the fifth color converter 145, which is a default setting, as a destination of the image data, and outputs information thereto (Step 120).

This causes the fifth color converter 145 to perform the color conversion of image data formed of color coordinate data (L*, a*, b*) in the L*a*b* color space into image data formed of color coordinate data (C, M, Y, K) for the "first four-color set" by using the fifth color conversion profile (Step 121). Then, the fifth color converter 145 outputs the image data obtained by the color conversion to the synthesis unit 15 (Step 122).

On the other hand, if the selector 140 has received from the system controller 30 a setting change instruction issued by the user for image data formed in the L*a*b* color space (Yes in Step 119), the selector 140 selects the sixth color converter 146 as a destination of the image data, and outputs information thereto (Step 123).

This causes the sixth color converter 146 to perform the color conversion of image data formed of color coordinate data (L*, a*, b*) in the L*a*b* color space into image data formed of color coordinate data (HC, HM, Y, K) for the "second four-color set" by using the sixth color conversion profile (Step 124). Then, the sixth color converter 146 outputs the image data obtained by the color conversion to the synthesis unit 15 (Step 125).

Subsequently, if the selector 140 has acquired, as information on the color format from the analysis unit 13, information indicating that colors constituting the image data are Pantone colors, which are an example of spot colors, (No in Step 118 and Yes in Step 126), and has not received from the system controller 30 a setting change instruction issued by the user for Pantone colors (No in Step 127), the selector 140 selects the seventh color converter 147, which is a default setting, as a destination of the image data, and outputs information thereto (Step 128).

This causes the seventh color converter 147 to perform the color conversion of image data formed of color coordinate data (L*, a*, b*) in the L*a*b* color space associated with Pantone colors into image data formed of color coordinate data (C, M, Y, K) for the "first four-color set" by using the seventh color conversion profile (Step 129). Then, the seventh color converter 147 outputs the image data obtained by the color conversion to the synthesis unit 15 (Step 130).

On the other hand, if the selector 140 has received from the system controller 30 a setting change instruction issued by the user for image data formed in the L*a*b* color space (Yes in Step 127), the selector 140 selects the eighth color converter 148 as a destination of the image data, and outputs information thereto (Step 131).

This causes the eighth color converter 148 to perform the color conversion of image data formed of color coordinate data (L*, a*, b*) in the L*a*b* color space associated with Pantone colors into image data formed of color coordinate data (HC, HM, Y, K) for the "second four-color set" by using the eighth color conversion profile (Step 132). Then, the eighth color converter 148 outputs the image data obtained by the color conversion to the synthesis unit 15 (Step 133).

Referring now to FIG. 6-3, if the selector 140 has acquired, as information on the color format from the analysis unit 13, information indicating that the image data is formed in the device CMYK color space (No in Step 126 and Yes in Step 134), and has not received from the system controller 30 a setting change instruction issued by the user for image data formed in the device CMYK color space (No in Step 135), the selector 140 selects the ninth color converter 149, which is a default setting, as a destination of the image data, and outputs information thereto (Step 136).

This causes the ninth color converter 149 to perform the color conversion of image data formed of color coordinate data (C, M, Y, K) in the device CMYK color space into image data formed of color coordinate data (C, M, Y, K) for the "first four-color set" by using the ninth color conversion profile (Step 137). Then, the ninth color converter 149 outputs the image data obtained by the color conversion to the synthesis unit 15 (Step 138).

On the other hand, if the selector 140 has received from the system controller 30 a setting change instruction issued by the user for image data formed in the device CMYK color space (Yes in Step 135), the selector 140 selects the tenth color converter 150 as a destination of the image data, and outputs information thereto (Step 139).

This causes the tenth color converter 150 to perform the color conversion of image data formed of color coordinate data (C, M, Y, K) in the device CMYK color space into image data formed of color coordinate data (HC, HM, Y, K) for the "second four-color set" by using the tenth color conversion profile (Step 140). Then, the tenth color converter 150 outputs the image data obtained by the color conversion to the synthesis unit 15 (Step 141).

Subsequently, if the selector 140 has acquired, as information on the color format from the analysis unit 13, information indicating that the image data includes achromatic colors having only lightness (No in Step 134), the selector 140 outputs image data to the synthesis unit 15 (Step 142).

Then, if the processing of all image data (data on each pixel in bitmap data) has been completed (Yes in Step 143), the synthesis unit 15 finishes synthesizing (merging) the image data obtained by the color conversion in the first to tenth color converters 141 to 150 for each pixel (each image area) and the image data formed of an achromatic color K, thus generating image data (C, M, HC, HM, Y, K) corresponding to, for example, one page (Step 144).

Further, the synthesis unit 15 outputs the image data (C, M, HC, HM, Y, K) formed of the six plates to the screen processor 16 (Step 145).

On the other hand, if the processing of all the image data has not been completed (No in Step 143), the processing returns to Step 101, and next image data is processed.

Thus, color reproducibility in the image forming apparatus is improved by using image data formed of six plates and selectively using color materials similar to but different from cyan, magenta and yellow.

[Second Exemplary Embodiment]

For the color conversion processor 14 of the first exemplary embodiment, a description has been given of a configuration in which one of a color conversion profile for conversion to the "first four-color set" formed of the C, M, Y and K colors and a color conversion profile for conversion to the "second four-color set" formed of the HC, HM, Y and K colors is selected in accordance with the color format (type or the like of an input color space constituting image data) of image data.

In the present exemplary embodiment, a description will be given of a configuration further including a function of automatically selecting a color conversion profile to be used for the color conversion of image data, on the basis of the relationship between the image data to be converted and each of color gamuts (color reproduction ranges: Gamuts) represented by the "first four-color set" and the "second four-color set."

Note that components similar to those of the first exemplary embodiment are denoted by similar reference numerals, and that detailed descriptions thereof will be omitted herein.

<Description of Color Conversion Processor>

The color conversion processor 14 of the present exemplary embodiment further includes an evaluator 160 in addition to the above-described configuration of the color conversion processor 14 of the first exemplary embodiment. The evaluator 160 judges which of the following color conversion profiles is suitable for the color conversion of image data included in a print job: a color conversion profile for conversion to the "first four-color set"; and a color conversion profile for conversion to the "second four-color set."

Figure 7:
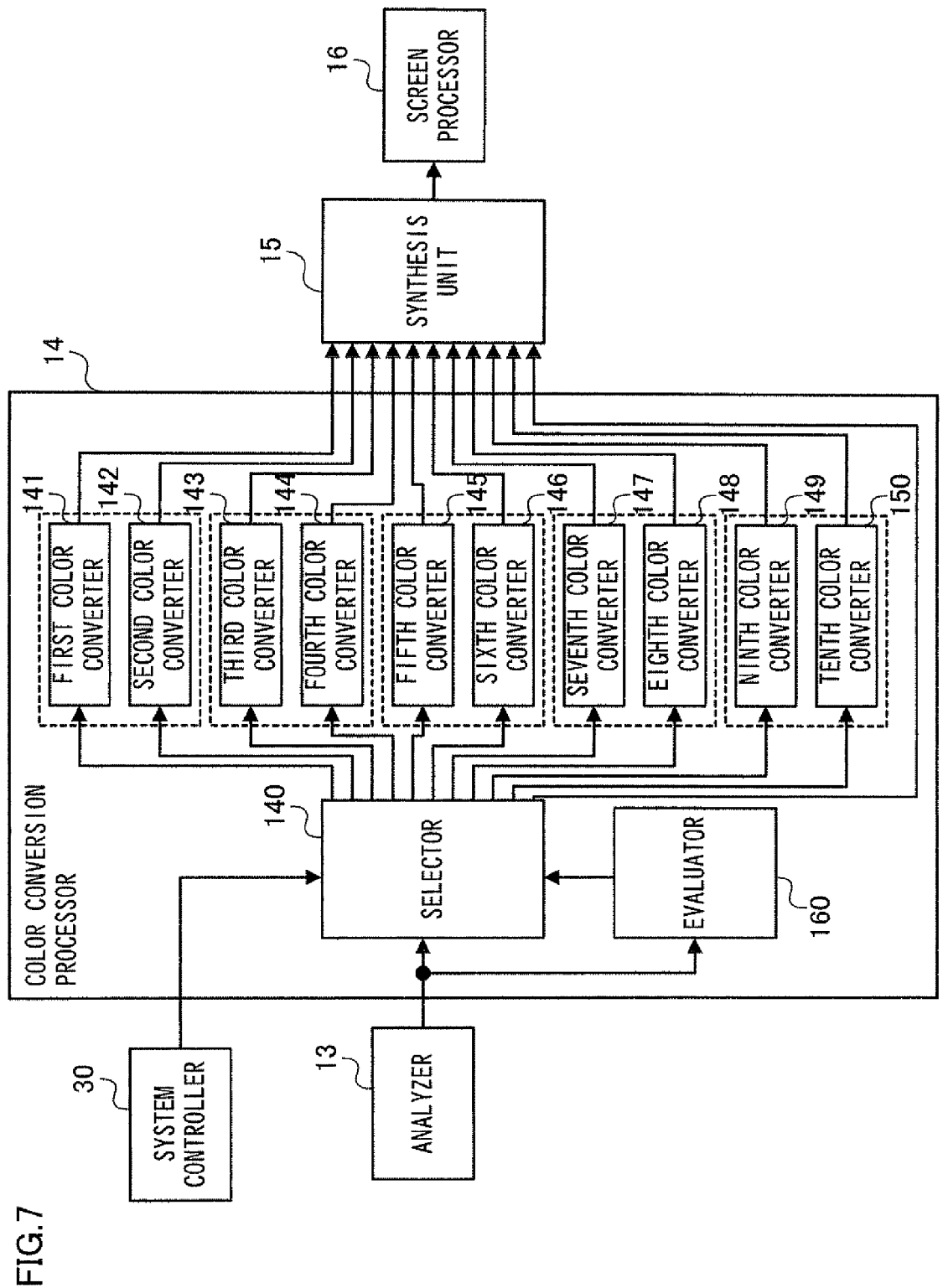
FIG. 7 is a block diagram showing a configuration of the color conversion processor according to the second exemplary embodiment.

Next, FIG. 7 is a block diagram showing a configuration of the color conversion processor 14 of the present exemplary embodiment.

The evaluator 160 shown in FIG. 7 functions as an evaluation unit that evaluates the first and second color conversion units in terms of suitability for the color conversion of image data in the first color space.

Note that the suitability herein is evaluated in terms of which of the first and second color conversion units causes a color difference to a lesser extent (a smaller color difference) for the purpose of achieving the maximum closest reproduction of a specified color. In the case of a specified color of a C hue group, for example, the evaluator 160 determines that one of the first and second color conversion units causing a smaller color difference is suitable, on the basis of the color differences obtained by using the HC and C colors, respectively.

<Description of Evaluation Method Using Evaluator>

The evaluator 160 calculates in advance color regions (color gamuts) in a device-independent color space (for example, the L*a*b* color space) that correspond to a color region in which colors are reproducible with the "first four-color set" formed of the C, M, Y and K colors and to a color region in which colors are reproducible with the "second four-color set" formed of the HC, HM, Y and K colors. Further, coordinates of vertices of a polyhedron (hereinafter, "color gamut boundary polygon") constituting the boundary of the color gamut are stored in an internal nonvolatile memory (for example, the NVM 104 in FIG. 2). The color gamut in the L*a*b* color space that corresponds to the region in which colors are reproducible with the "first four-color set" is referred to as a "first color gamut," while the color gamut in the L*a*b* color space that corresponds to the region in which colors are reproducible with the "second four-color set" is referred to as a "second color gamut."

The evaluator 160 first acquires image data (bitmap data) on an object from the analysis unit 13, and then converts the acquired image data to image data (L*, a*, b*) in the L*a*b* color space. At this time, the evaluator 160 determines whether the converted image data is within a reproducible range of the "first color gamut" or the "second color gamut," and calculates a value such as an inclusion rate in a color gamut for each of the "first color gamut" and the "second color gamut." For example, assume a case where the inclusion rate of image data on an object in the "first color gamut" is 95%, while that in the "second color gamut" is 100%. In this case, the evaluator 160 evaluates that a color converter for conversion to the "second color gamut" is to be specified for the color conversion of this object.

Note that in this case, calculation may be made on the color differences (Euclidean distances) between data determined to be outside of the reproducible range and coordinates of vertices of each of the outer polygon of the "first color gamut" and the "second color gamut." Then, the evaluator 160 may evaluate that the color gamut having a smaller maximum color difference is to be selected, or may evaluate the suitability with consideration given also to the inclusion rate in a color gamut.

Then, the evaluator 160 sends a evaluation result concerning the suitability of the color conversion profiles to the selector 140.

If the selector 140 has acquired from the analysis unit 13 information indicating that the color space constituting the image data is the device RGB color space, the selector 140 selects one of the first color converter 141 and the second color converter 142 based on the evaluation result from the evaluator 160.

If the selector 140 has acquired from the analysis unit 13 information indicating that the color space constituting the image data is the sRGB color space, the selector 140 selects one of the third color converter 143 and the fourth color converter 144 based on the evaluation result from the evaluator 160.

If the selector 140 has acquired from the analysis unit 13 information indicating that the color space constituting the image data is the L*a*b* color space, the selector 140 selects one of the fifth color converter 145 and the sixth color converter 146 based on the evaluation result from the evaluator 160.

If the selector 140 has acquired from the analysis unit 13 information indicating that colors constituting the image data are Pantone colors, which are an example of spot colors, the selector 140 selects one of the seventh color converter 147 and the eighth color converter 148 based on the evaluation result from the evaluator 160.

If the selector 140 has acquired from the analysis unit 13 information indicating that the color space constituting the image data is the device CMYK color space, the selector 140 selects one of the ninth color converter 149 and the tenth color converter 150 based on the evaluation result from the evaluator 160.

Note that in the present exemplary embodiment, a configuration has been employed in which the image forming function unit 40 uses as toners, which are an example of color materials, toners of the six colors of C (cyan), M (magenta), HC (high chroma cyan), HM (high chroma magenta), Y (yellow) and K (black). Instead of such a configuration, for example, a configuration may be employed in which toners of seven colors of C, M, HC, HM, HY (high chroma yellow), Y and K are used, or a configuration may be employed in which toners of eight colors of C, M, HC, HM, HY, Y, LK (light black) and K are used. The HY color herein is a yellow having higher chroma than that of the Y color or having a hue angle different from that of the Y color, while the LK color is a black having lightness than that of the K color.

In such cases, the color conversion processor 14 includes, for example, the following color conversion profiles: a color conversion profile for conversion to a "first four-color set" formed of the C, M, Y and K colors; and a color conversion profile for conversion to a "second four-color set" formed of the HC, HM, HY and K colors or a "second four-color set" formed of the HC, HM, HY and LK colors.

Moreover, instead of a configuration in which two color conversion profiles, i.e., a color conversion profile for conversion to the "first four-color set" and a color conversion profile for conversion to the "second four-color set," are set as color conversion profiles provided in the color conversion processor 14, a configuration may be employed in which three or more color conversion profiles which additionally includes a color conversion profile for conversion to a "third four-color set" for representing, for example, tone between that of the "first four-color set" and that of the "second four-color set."

As described above, the color conversion processor 14 provided in the image forming system 1 of the present exemplary embodiment includes plural color conversion profiles in which output color spaces are respectively set as different combinations (four-color set) of four color materials, for example, the "first four-color set" formed of the C, M, Y and K colors, the "second four-color set" formed of the HC, HM, Y and K colors, and the like. For image data included in a print job, the color conversion processor 14 selects and uses an appropriate color conversion profile in accordance with the color format of the image data.

Thus, color conversion to an output color space including four colors is performed with each of the color conversion profiles to be selectively used. Accordingly, unlike the case where color conversion to an output color space including more than four colors, for example, six colors (C, M, HC, HM, Y and K colors), is collectively performed, image formation processing (color conversion processing) is achieved with a configuration equivalent to that for conventional four-color separation processing. Additionally, although color separation into six colors is complex, a conventional technique is applicable to color separation into four colors, and thus an existing generation tool is usable to generate profiles. Furthermore, since one of a color conversion profile for conversion to the "first four-color set" and a color conversion profile for conversion to the "second four-color set" is selected in accordance with the color format of the inputted image data, color reproduction in an output color space corresponding to the colors of the inputted image data is performed. Accordingly, color reproducibility is improved.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processor comprising:
a receiving unit that receives an input of image data in a first color space;
a first color conversion unit that performs color conversion of the image data in the first color space received by the receiving unit to image data formed of a first combination of a plurality of color components in a second color space, the first combination of the plurality of color components including a smaller number of color components than the number of color materials to be used in formation of an image;
a second color conversion unit, which is different from the first color conversion unit, that performs color conversion of the image data in the first color space received by the receiving unit to image data formed of a second combination of a plurality of color components in the second color space, the second combination of the plurality of color components being different from the first combination of the plurality of color components and including a smaller number of color components than the number of color materials to be used in formation of an image; and
an image generating unit that generates an image based on at least the image data generated by the first color conversion unit and the image data obtained through the color conversion by the second color conversion unit; wherein the image processor comprises both of the first color conversion unit and the second color conversion unit so as to correspond to a color format of image data in the first color space,
the image processor further comprises:
an evaluation unit that evaluates the first color conversion unit and the second color conversion unit in terms of suitability for the color conversion of image data in the first color space, on the basis of a positional relationship in the same color space between the image data in the first color space received by the receiving unit and each of a color region in the second color space in which colors are reproduced with the first combination of the plurality of color components and a color region in the second color space in which colors are reproduced with the second combination of the plurality of color components;
a selection unit that selects one of the first color conversion unit and the second color conversion unit in accordance with the color format of the image data in the first color space, for the color conversion of the image data in the first color space,
the selection unit selects one of the first color conversion unit and the second color conversion unit provided so as to correspond to the color format of the image data in the first color space, in accordance with an evaluation result made by the evaluation unit and with the color format,
the evaluation unit calculates a color difference between color coordinate data in a device-independent color space corresponding to the image data in the first color space, and a boundary of a color region in the device-independent color space corresponding to each of a color region in the second color space in which colors are reproducible with the first combination of the plurality of color components and a color region in the second color space in which colors are reproducible with the second combination of the plurality of color components, and
the evaluation unit evaluates the first color conversion unit and the second color conversion unit by using the color difference.

2. The image processor according to claim 1, wherein the second color conversion unit performs the color conversion of the image data in the first color space to image data including as color components the second combination of the plurality of color components being higher in at least any one of lightness and chroma than the first combination of the plurality of color components.

3. An image forming system comprising:
an image processing unit that performs image processing on image data in a first color space to generate image data in a second color space; and
an image generating unit that generates an image on a recording medium on the basis of the image data in the second color space generated by the image processing unit, wherein
the image processing unit includes:
a receiving unit that receives an input of image data in the first color space;
a first color conversion unit that performs color conversion of the image data in the first color space received by the receiving unit to image data formed of a first combination of a plurality of color components in the second color space, the first combination of the plurality of color components including a smaller number of color components than the number of color materials to be used in formation of an image;

a second color conversion unit, which is different from the first color conversion unit, that performs color conversion of the image data in the first color space received by the receiving unit to image data formed of a second combination of a plurality of color components in the second color space, the second combination of the plurality of color components being different from the first combination of the plurality of color components and including a smaller number of color components than the number of color materials to be used in formation of an image, and the image generating unit generates an image based on at least the image data generated by the first color conversion unit of the image processing unit and the image data obtained through the color conversion by the second color conversion unit of the image processing unit, wherein the image processor comprises both of the first color conversion unit and the second color conversion unit so as to correspond to a color format of image data in the first color space, the image processor further comprises:

an evaluation unit that evaluates the first color conversion unit and the second color conversion unit in terms of suitability for the color conversion of image data in the first color space, on the basis of a positional relationship in the same color space between the image data in the first color space received by the receiving unit and each of a color region in the second color space in which colors are reproduced with the first combination of the plurality of color components and a color region in the second color space in which colors are reproduced with the second combination of the plurality of color components;

a selection unit that selects one of the first color conversion unit and the second color conversion unit in accordance with the color format of the image data in the first color space, for the color conversion of the image data in the first color space, the selection unit selects one of the first color conversion unit and the second color conversion unit provided so as to correspond to the color format of the image data in the first color space, in accordance with an evaluation result made by the evaluation unit and with the color format, the evaluation unit calculates a color difference between color coordinate data in a device-independent color space corresponding to the image data in the first color space, and a boundary of a color region in the device-independent color space corresponding to each of a color region in the second color space in which colors are reproducible with the first combination of the plurality of color components and a color region in the second color space in which colors are reproducible with the second combination of the plurality of color components, and the evaluation unit evaluates the first color conversion unit and the second color conversion unit by using the color difference.

4. The image forming system according to claim 3, wherein the image generating unit generates an image by using color materials formed of both of the first combination of the plurality of color components and the second combination of the plurality of color components.

5. The image forming system according to claim 3, wherein the image processing unit comprises both of the first color conversion unit and the second color conversion unit so as to correspond to a color format of image data in the first color space, the image processing unit further comprises:

an evaluation unit that evaluates the first color conversion unit and the second color conversion unit in terms of suitability for the color conversion of image data in the first color space, on the basis of a positional relationship in the same color space between the image data in the first color space received by the receiving unit and each of a color region in the second color space in which colors are reproduced with the first combination of the plurality of color components and a color region in the second color space in which colors are reproduced with the second combination of the plurality of color components; and a selection unit that selects one of the first color conversion unit and the second color conversion unit in accordance with the color format of the image data in the first color space, for the color conversion of the image data in the first color space, and the selection unit of the image processing unit selects one of the first color conversion unit and the second color conversion unit provided so as to correspond to the color format of the image data in the first color space, in accordance with an evaluation result made by the evaluation unit and with the color format.

6. The image forming system according to claim 3, wherein the second color conversion unit of the image processing unit performs the color conversion of the image data in the first color space to image data including as color components the second combination of the plurality of color components being higher in at least any one of lightness and chroma than the first combination of the plurality of color components.

7. An image processing method to be performed by at least one processor, the method comprising:

receiving an input of image data in a first color space by a receiving unit;

performing color conversion by a first color conversion unit, of the image data from the receiving unit in the first color space thus received to image data formed of a first combination of a plurality of color components in a second color space, the first combination of the plurality of color components including a smaller number of color components than the number of color materials to be used in formation of an image;

performing color conversion by a second color conversion unit, which is different from the first color conversion unit, of the image data from the receiving unit in the first color space thus received to image data formed of a second combination of a plurality of color components in the second color space, the second combination of the plurality of color components being different from the first combination of the plurality of color components and including a smaller number of color components than the number of color materials to be used in formation of an image; and selecting the image data formed of the first combination of the plurality of color components and the second combination of the plurality of color components, wherein an image processor comprises both of the first color conversion unit and the second color conversion unit so as to correspond to a color format of image data in the first color space, the method further comprising:

evaluating, by an evaluation unit, the first color conversion unit and the second color conversion unit in terms of suitability for the color conversion of image data in the first color space, on the basis of a positional relationship in the same color space between the image data in the first color space received by the receiving unit and each of a color region in the second color space in which colors are reproduced with the first combination of the plurality of color components and a color region in the second color space in which colors are reproduced with the second combination of the plurality of color components;

selecting, by a selection unit, one of the first color conversion unit and the second color conversion unit in accordance with the color format of the image data in the first color space, for the color conversion of the image data in the first color space, selecting, by the the selection unit, one of the first color conversion unit and the second color conversion unit provided so as to correspond to the color format of the image data in the first color space, in accordance with an evaluation result made by the evaluation unit and with the color format, calculating, by the evaluation unit, a color difference between color coordinate data in a device-independent color space corresponding to the image data in the first color space, and a boundary of a color region in the device-independent color space corresponding to each of a color region in the second color space in which colors are reproducible with the first combination of the plurality of color components and a color region in the second color space in which colors are reproducible with the second combination of the plurality of color components, and evaluating, by the evaluation unit, the first color conversion unit and the second color conversion unit by using the color difference.

8. A non-transitory computer readable medium storing a program that causes a computer to execute a process for image processing, the process comprising:

receiving an input of image data in a first color space by a receiving unit;

performing color conversion by a first color conversion unit of the image data from the receiving unit in the first color space thus received to image data formed of a first combination of a plurality of color components in a second color space, the first combination of the plurality of color components including a smaller number of color components than the number of color materials to be used in formation of an image;

performing color conversion by a second color conversion unit, which is different from the first color conversion unit of the image data from the receiving unit in the first color space thus received to image data formed of a second combination of a plurality of color components in the second color space, the second combination of the plurality of color components being different from the first combination of the plurality of color components and including a smaller number of color components than the number of color materials to be used in formation of an image; and selecting the image data formed of the first combination of the plurality of color components and the second combination of the plurality of color components, wherein an image processor comprises both of the first color conversion unit and the second color conversion unit so as to correspond to a color format of image data in the first color space, the method further comprising:

evaluating, by an evaluation unit, the first color conversion unit and the second color conversion unit in terms of suitability for the color conversion of image data in the first color space, on the basis of a positional relationship in the same color space between the image data in the first color space received by the receiving unit and each of a color region in the second color space in which colors are reproduced with the first combination of the plurality of color components and a color region in the second color space in which colors are reproduced with the second combination of the plurality of color components;

selecting, by a selection unit, one of the first color conversion unit and the second color conversion unit in accordance with the color format of the image data in the first color space, for the color conversion of the image data in the first color space, selecting, by the the selection unit, one of the first color conversion unit and the second color conversion unit provided so as to correspond to the color format of the image data in the first color space, in accordance with an evaluation result made by the evaluation unit and with the color format, calculating, by the evaluation unit, a color difference between color coordinate data in a device-independent color space corresponding to the image data in the first color space, and a boundary of a color region in the device-independent color space corresponding to each of a color region in the second color space in which colors are reproducible with the first combination of the plurality of color components and a color region in the second color space in which colors are reproducible with the second combination of the plurality of color components, and evaluating, by the evaluation unit, the first color conversion unit and the second color conversion unit by using the color difference.

9. The image processor of claim 1, further comprising:

a synthesis unit that synthesizes the image data obtained from at least the first and second color conversion units into color plates, wherein each of the color plates includes only image data generated by the color conversion in anyone of the first and second color conversion units.

10. The image forming system of claim 3, further comprising:

a synthesis unit that synthesizes the image data obtained from at least the first and second color conversion units into color plates, wherein each of the color plates includes only image data generated by the color conversion in anyone of the first and second color conversion units.

11. The image processing method of claim 7, further comprising:

synthesizing the image data obtained from the color conversion of the image data in the first color space thus received to image data formed of the first and second combinations of the plurality of color components in the second color space into color plates, wherein each of the color plates includes only image data generated by the color conversion in anyone of the first and second combinations of the plurality of color components in the second color space.

12. The non-transitory computer readable medium of claim 8, the process further comprising:
- synthesizing the image data obtained from the color conversion of the image data in the first color space thus received to image data formed of the first and second combinations of the plurality of color components in the second color space into color plates,
- wherein each of the color plates includes only image data generated by the color conversion in anyone of the first and second combinations of the plurality of color components in the second color space.

* * * * *